US006261410B1

(12) United States Patent
Flecken et al.

(10) Patent No.: US 6,261,410 B1
(45) Date of Patent: Jul. 17, 2001

(54) PROCESS FOR SEPARATING COMPRESSED MATERIAL CONTAINING PAPER FIBERS

(75) Inventors: Peter Flecken; Erich Peters, both of Euskirchen; Jakob Udelhofen, Zülpich, all of (DE)

(73) Assignee: Voith Sulzer Papiertechnik Patent GmbH, Heidenheim (DE)

( * ) Notice: Subject to any disclaimer, the term of this patent is extended or adjusted under 35 U.S.C. 154(b) by 0 days.

(21) Appl. No.: 09/418,133

(22) Filed: Oct. 14, 1999

(30) Foreign Application Priority Data

Oct. 15, 1998 (DE) .............................. 198 47 532

(51) Int. Cl.[7] .............................. D21B 1/32; D21D 5/02; D21D 5/20
(52) U.S. Cl. ................................ 162/4; 162/55; 209/705; 209/632; 241/101; 241/186.4; 241/280
(58) Field of Search .......................... 162/4, 55; 100/95, 100/176; 241/186.4, 101, 280; 209/606, 621

(56) References Cited

U.S. PATENT DOCUMENTS

| 2,236,969 | 4/1941 | Flatboe ....................... 83/6 |
| 3,643,591 | 2/1972 | Bragg ........................ 100/95 |
| 5,667,079 | 9/1997 | Jongebloed .................. 209/589 |

FOREIGN PATENT DOCUMENTS 3439098    3/1986   (DE) .

*Primary Examiner*—Dean T. Nguyen
(74) *Attorney, Agent, or Firm*—Greenblum & Bernstein, P.L.C.

(57) ABSTRACT

Process and apparatus for separating compressed material containing paper fibers where the apparatus includes at least three hammer rollers arranged essentially in a same plane and each hammer roller includes rotatable hammers. The process includes rotating the rotatable hammers, transporting the material over the at least three hammer rollers in a transport direction essentially parallel to the plane and transverse to the axes of the rollers, breaking up the material into fine material and non-fine material, and separating the fine material from the non-fine material by allowing the fine material to pass through gaps formed between the hammer rollers. The apparatus includes a machine frame and a plurality of rotors arranged next to one another in the machine frame. Axes of the driven rotors are arranged to lie in at least one plane, and the rotors are positioned to form free gaps between the driven rotors. A delivery unit, positioned above the plurality of rotors, is adapted to deliver the compressed material to the plurality of rotors and a removal unit, positioned below the plurality of rotors, is adapted to remove the processed material. The plurality of rotors include hammer rollers having shafts coupled to rotatable hammers, and a driver is provided for driving at least some adjacent hammer rollers in a same rotational direction.

31 Claims, 6 Drawing Sheets

PROCESS FOR SEPARATING COMPRESSED MATERIAL CONTAINING PAPER FIBERS

CROSS-REFERENCE TO RELATED APPLICATIONS

The present application claims priority under 35 U.S.C. §119 of German Patent Application No. 198 47 532.2, filed on Oct. 16, 1998, the disclosure of which is expressly incorporated by reference herein in its entirety.

BACKGROUND OF THE INVENTION

1. Field of the Invention

The present invention relates to a process for separating compressed material containing paper fibers including paper or paperboard webs.

2. Discussion of Background Information

The manufacture of paper or paperboard frequently uses waste paper which is supplied in the form of bales. Even native pulp is often initially formed into bales after production. Such bales are generally produced by compressing the material and then tying it with wires or bands, thus, providing a compact form that is relatively easy to transport. For use as new raw material, it is necessary to break up these compressed bales into individual paper webs or pieces again in order to be able to perform the subsequent procedures for processing the material. Even after the binding wires or bands have been removed from compressed bales, in most cases they stay in one piece or in such large pieces that feeding them into equipment, such as a water-operated pulp dissolver, can cause problems. Moreover, in many cases the material delivered is contaminated with foreign materials, e.g., plastic film, that have been compressed into the bale. These plastic films often adhere to the paper material, which poses an obstacle to their early removal.

German Application No. DE 34 39 098 A1 describes a process in which, in a relatively resource-intensive fashion, bales of recycled waste paper are separated, broken up, and cleaned and brought into suspension by subsequently adding water to them in a pulper. Although this process can be viewed as a suitable step for starting the processing of recycled paper, it has not been generally adopted on account of its high cost.

Machines are already known with which a process of the type generally described above could be performed. These are sturdy coarse chopping or grinding machines, e.g., shredders, that are specifically intended to pre-grind coarse material, e.g., scrap or rocky material, so that it can subsequently further processed or sorted. The use of a shredder in a process of the type generally described above would require a very large machine with a correspondingly high price on account of the size of the bales or bale fragments. Thus, the disadvantages of such a device would include not only its cost and the space required, but also high power consumption. In addition, the operation of such a machine is very harsh and causes a considerable amount of noise.

Another possibility would be the use of a screw extruder or another type of open screw conveyor with at least two conveyor screws. However, machines of this type are also very expensive and have a high power consumption. Moreover, it is necessary to take into account that these machines can also at least partially crush the compressed pulp rather than separate it.

SUMMARY OF THE INVENTION

The present invention provides a process with which it is possible to separate compressed material containing paper fibers at least to such an extent that processing in a pulp dissolver is possible and appropriate. In this manner, cost is kept as low as possible.

Therefore, the present invention relates to a process that includes transporting a material, over at least three hammer rollers arranged essentially in a plane, in a direction essentially parallel to the plane and transverse to the axes of the rollers. The hammer rollers include rotatable hammers adapted to penetrate the material and separate it. Further, the hammer rollers are arranged to form gaps between the hammer rollers so that broken up fine material falls through the gaps to be separated from the material which is broken up to a lesser extent or not at all.

The apparatus of the instant invention includes a machine frame having a number of driven rotors arranged next to one another in the machine frame. The axes of the rotors are arranged to lie at least partially in one plane and free gaps are located between the rotors. A delivery unit is provided to deliver a material to be processed into a region above the rotors, and a removal unit is provided to remove the processed material from a region below the rotors. The rotors include hammer rollers having shafts with hammers attached thereto, and at least some adjacent hammer rollers are adapted to be rotatably drivable in a same rotational direction.

When the process according to the invention is used, the material may be continually separated as it passes over rotating hammer rollers to break up the bond created by the compression. In other words, the bales and pieces of bales are broken up. During the process, the material can be pressed against the rotating hammers because of its weight, but can also escape upward or to the side upon occasion. Through this form of mechanical processing, forces may be transmitted that are especially well suited to breaking up the material into a fine material. This is because these forces are sufficient to break the bond of the compressed material, but are not great enough that unnecessary power consumption is required and/or that there is a risk of damage to the devices used during the process, especially from foreign bodies contained in the material.

A further advantage is that the process can be adjusted very well to the particular application at hand. After all, the form in which the material is delivered can be expected to vary considerably. In addition to great variation in the bale size and compression force, variation also results from differences in the material itself It is easy to see that heavy cardboard items will behave differently on the baling press than scraps of office waste (e.g., printed matter, files). Further differences can include differences in moisture content and different degrees of contamination. The process of the present invention can be adapted to particular applications through the apparatus, e.g., by appropriately selecting the number of hammer rollers and/or the shape of the hammers used. But even when an existing apparatus is used that is suitable for the process, one can react with flexibility to different requirements through such measures as tilting the apparatus and varying the hammer roller speed.

Accordingly, the instant invention is directed to a process for separating compressed material containing paper fibers in an apparatus that includes at least three hammer rollers arranged essentially in a same plane and each hammer roller includes rotatable hammers. The process includes rotating the rotatable hammers, transporting the material over the at least three hammer rollers in a transport direction essentially parallel to the plane and transverse to the axes of the rollers, breaking up the material into fine material and non-fine material, and separating the fine material from the non-fine material by allowing the fine material to pass through gaps formed between the hammer rollers.

In accordance with another feature of the instant invention, the non-file material may include coarse material, and the process can further include carrying away the coarse material.

In accordance with still another feature of the invention, at the start of the breaking up and separating, the material can include one of bales or large pieces of bales at least some of which have a weight of at least approximately 100 kg. The material may not include binding wires or bands.

According to a further feature of the present invention, the process can further include orienting the plane at an angle between approximately 0° and 90° relative to the horizontal. The plane may be oriented at an angle between approximately 20° and 50°. Moreover, the plane can be oriented at an angle sufficient to substantially evenly distribute the material over the at least three hammer rollers in the transport direction.

According to still another feature of the present invention, the apparatus can further include a material supply device, and the process can further include supplying the material on the material supply device in a direction substantially perpendicular to the transport direction.

In accordance with a still further feature of the invention, the non-fine material includes coarse material, and the process can include further processing the coarse material together with the fine material.

In accordance with another feature of the instant invention, the process can further include conveying the fine material to a pulp dissolver, and converting the fine material into a suspension.

According to still another feature of the invention, the process can further include transmitting forces to the material with the hammers. The forces are lateral forces having a component lying in the direction of the axes of the hammer rollers.

According to a further feature of the present invention, the apparatus can further include gaps formed between envelope curves of the rotatable hammers of the hammer rollers, and the process can further include sizing the gaps so that the fine material can fall down through them.

In accordance with a still further feature of the invention, the apparatus can further include gaps formed between shafts of the hammer rollers having a distance of between approximately 200 and 1000 mm.

In accordance with still another feature of the instant invention, the apparatus can further include a portion of the at least three hammers forming a first section and another portion of the at least three hammers forming a second section, such that the second section is arranged above and downstream from, relative to the transport direction, the first section, and at least one additional hammer roller with rotatable hammers, and the process can further include returning non-fine material to the first section via the at least one additional hammer roller. Further, the separation can occur in both the first and second section. Further still, the process can further include moving at least one hammer roller of the second section to increase a distance from a neighboring hammer roller. The second section may include two hammer rollers arranged one atop the other.

According to a further feature of the present invention, the process can further include driving the hammers with a circumferential speed of between approximately 1 and 3 m/sec.

According to still another feature of the present invention, the process can further include rotatably driving neighboring hammer rollers at different speeds.

In accordance with another feature of the invention, the apparatus can further include arranging the at least three hammer rollers into a first and a second section, in which the second section is located downstream, relative to the transport direction, of the first section, and dividing the first section into a first and second group, in which the second group is located downstream, relative to the transport direction, of the first group, and the process can further include rotating the hammer rollers in a same section in a same direction and at a same circumferential speed, and rotating the hammer rollers in another section at a different circumferential speed. The process can further include rotating the hammer rollers in the first group in a same direction and at a same circumferential speed, and rotating the hammer rollers in the second group at a different circumferential speed. The circumferential speed of the hammer rollers of the first group may be slower than circumferential speed of the hammer rollers of the second group. The circumferential speed of the hammer rollers of the first section may be slower than the circumferential speed of the hammer rollers of the second section. Further, the hammer rollers of a same group may be arranged in a same plane. Still further, planes for the different groups can be oriented at different angles. Further, the hammer rollers of a same section may be arranged in a same plane. Planes for the different sections may be oriented at different angles.

According to a still further feature of the present invention, a total specific work to convert the material into fine material through the breaking up and separation is a maximum of approximately 10 kWh per ton of fine material based on absolute dry weight.

According to another feature of the instant invention, the material can include at least one of paper or paperboard webs and can have a water content that does not exceed approximately 70%. Further, a water content of the material can be between approximately 3% and 30%.

In accordance with yet another feature of the present invention, the process can further include reversing a rotational direction of at least one portion of the at least three hammer rollers at certain time intervals, whereby bands, films, and other elongated items that become wound around the shaft can be unwound and removed.

The present invention is also directed to an apparatus for processing a compressed material containing paper fibers. The apparatus includes a machine frame and a plurality of rotors arranged next to one another in the machine frame. Axes of the driven rotors are arranged to lie in at least one plane, and the rotors are positioned to form free gaps between the driven rotors. A delivery unit, positioned above the plurality of rotors, is adapted to deliver the compressed material to the plurality of rotors and a removal unit, positioned below the plurality of rotors, is adapted to remove the processed material. The plurality of rotors include hammer rollers having shafts coupled to rotatable hammers, and a driver is provided for driving at least some adjacent hammer rollers in a same rotational direction.

According to another feature of the instant invention, the hammer rollers and rotatable hammers can be structured and arranged such that envelope curves of the hammers of one hammer roll are spaced a distance of at least approximately 30 mm from envelope curves of the hammers of a neighboring hammer roller.

According to still another feature of the invention, the hammers can be positioned to extend radially outwardly from the shaft a distance of at least approximately 50 mm.

In accordance with a further feature of the present invention, axially adjacent hammers on the shaft may be arranged to be circumferentially offset from one another.

In accordance with a still further feature of the invention, the hammers include working surfaces that are oriented at an angle to the circumferential direction.

In accordance with another feature of the present invention, the hammers can have a parallelepiped shape. Alternatively, or additionally, the hammers can have a triangular profile with an axially oriented upper edge, and a triangular profile with the top edge oriented in a circumferential direction. Alternatively, or additionally, the hammers can taper radially outwardly, a front side of the hammers can be tilted backward relative to the rotational direction, and/or a surface element can be arranged to connect axially adjacent hammers to one another.

According to a further feature of the invention, a surface element can be arranged to connect axially adjacent hammers to one another, thereby forming a continuous processing surface. Further, the surface element can include a wear-resistant, enclosing jacket. Further still, support plates can be asymmetrically arranged on the shaft and can be at least partially circumferentially offset from one another, and the support plates can be positioned to support the surface element.

In accordance with a still further feature of the invention, a first portion of the plurality of rotors can be arranged into a first section, such that the rotors of the first portion are arranged in at least a first plane. A second portion of the plurality of rotors can be arranged into a second section, such that the rotors of the second portion are arranged in a second plane. The second section can be arranged above and downstream from, relative to the transport direction, the first section. Further, at least one additional hammer roller with rotatable hammers can be positioned to return non-processed material to the first section. The rotors of the first section may be grouped into at least a first and second group, in which the second group is located downstream, relative to the transport direction, of the first group, and the rotors of the first group may be arranged in a first group plane and the rotors of the second group are arranged in a second group plane. The first group plane can be oriented at an angle to horizontal that is greater than that of the second group plane. The first group plane can be oriented at an angle to horizontal that is less than that of the second group plane. Alternatively, the first and second group plane can be oriented at a same angle to horizontal.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 7A–7F illustrate various hammer shapes;

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
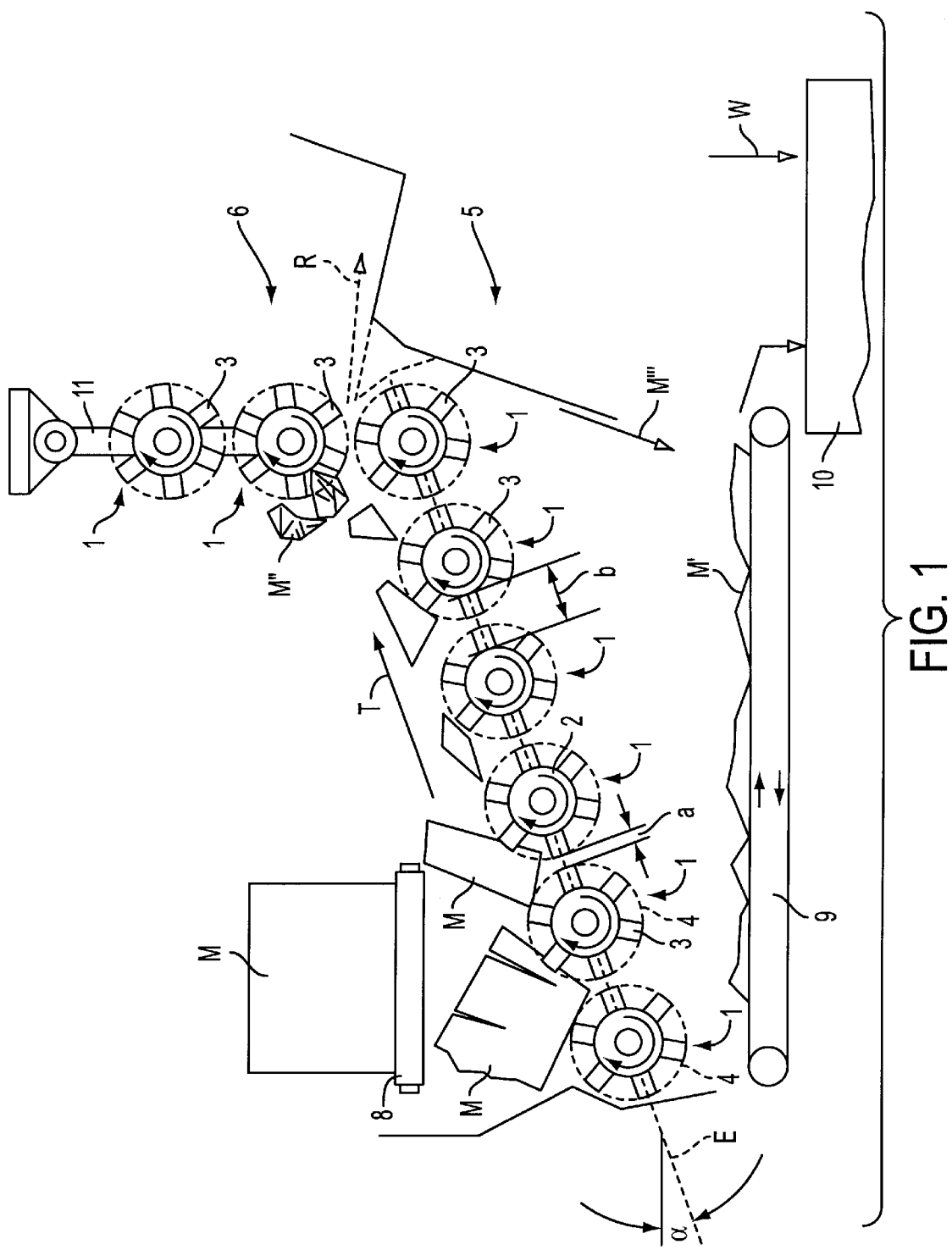
FIG. 1 illustrates a basic sequence of the process of the invention using a suitable apparatus.

FIG. 1 illustrates a sequence of the process according to the invention using one of the possible embodiments of the device. On the left, a supplying conveyor belt 8, that is only partially shown, transports a compressed bale made up of material M containing paper fibers having a water content that does not exceed approximately 70%, and preferably between approximately 3% and 30%. The bale or large pieces of the bale may have a weight of at least approximately 100 kg. While not shown, a wire removal station, which is known per se, can be provided to remove binding wires or bands that hold the bale together during transport. While prior removal is especially useful; options, which will be later discussed, can also be provided to remove the wires or bands later, e.g., during the separation and breakup of the material. FIG. 1 further shows an exemplary arrangement that includes, e.g., six hammer rollers 1 are arranged in a plane E to form a first section 5. Each hammer roller 1 is provided with a number of rotatable hammers 3. Hammer rollers 1 are set in rotation by a drive (not shown) and have a rotational direction to convey material M, lying on top of hammer rollers 1, upwardly in a transport direction T, which is approximately parallel to plane E. Hammers 3 may be operated with a circumferential speed of, e.g., between approximately 1 and 3 m/sec. In this example, transport direction T is also transverse to the travel direction of supplying conveyor belt 8. In this manner, broken-off bale fragments lie transverse to hammer rollers 1 and do not block the spaces or gaps formed between hammer rollers 1. By the action of roller hammers 3, material M is separated and possibly broken up so that a fine material M' can fall between hammers 3 and/or hammer rollers 1. To this end, neighboring shafts 2 are arranged such that gaps with a clear opening b are formed between them. Fine material M', which is composed essentially of pieces of paper or paperboard, is brought by a conveyor belt 9 into pulp dissolver 10 to place it in suspension with water W. Additional processing is also conceivable, e.g., further breakup and/or removal of non-fiber components. In accordance with the present invention, a total specific work required to convert compressed material M into fine material M', through breaking up and separation, is a maximum of approximately 10 kWh per ton of fine material M', based on absolute dry weight.

Hammer rollers 1 are arranged such that envelope curves 4 of hammers 3 do not cross or touch the envelope curves 4 of neighboring rollers. Rather, envelope curves 4 are radially separated from one another by a distance a. Hammers 3 can be rigidly attached to shaft 2 of hammer roller 1, but can also be attached either elastically or in an articulated manner. Plane E lies at an angle $\alpha$ to the horizontal between approximately 0° to 90° degrees, and preferably between approximately 20° and 50°. In this exemplary illustration, a is approximately 30°. Angle $\alpha$ essentially determines the amount of time in which material M passes hammer rollers 1. Thus, an adjustment of angle $\alpha$ can be used for control.

In the exemplary embodiment, a part of material M that has not been separated (broken up) enough after a single pass through first section 5 to fall through the gaps can be collected by a seventh and/or eighth hammer roller in a second section 6 as coarse material M" and thrown back into the region of the hammer rollers of first section 5. The parts of material M or of coarse material M" which do not reach fine material M', even after several passes through, are resistant material M''', which generally includes large sheets of paper/large cardboard products, possibly mixed with impurities (plastic films). Resistant material M''' can be removed from the range of action of hammer rollers 1 and can be further processed, e.g., together with fine material M', or it can make up a fraction, i.e., reject R. It is advantageous if reject R contains as little fiber as possible. Where this is not achieved, post-sorting can be performed, e.g., possibly with the addition of water. At the point where reject R or resistant material M''' is removed from the system, e.g., at a transition between first section 5 and second section 6, provisions can be made for an opening gap formed between adjacent hammer rollers to prevent clogging of the device. For example, hammer rollers 1 of second section 6 can be mounted in a frame 11, which is suspended in a pendulum-like fashion or by springs. In the exemplary embodiment, frame 11 can swing to the side when necessary, either automatically or with the aid of a special device. Further, it is possible to utilize other evading movements, e.g., upward movement.

FIG. 1 is not suited to show the special design details of the apparatus of the invention and is intended solely to explain one possible form of the process sequence and corresponding machine functions. In practice, the number of hammer rollers 1 needed is usually higher than as shown or as in FIGS. 2–4.

Figure 2:
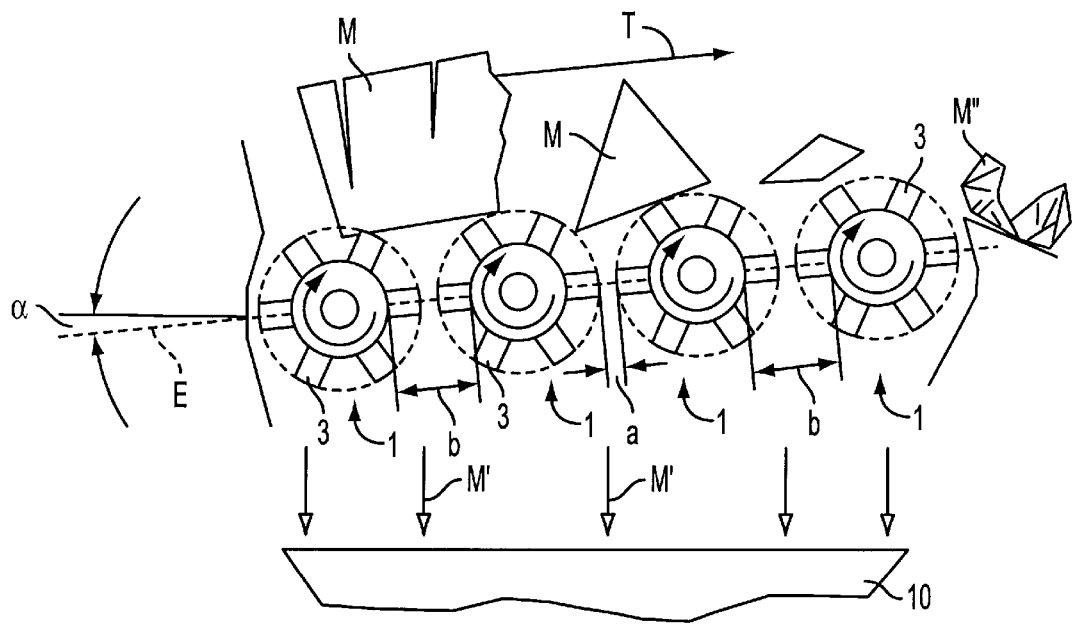
FIGS. 2, 3, 4, and 5 schematically illustrate alternative process sequences with appropriate apparatuses.

In accordance with FIG. 2, the process according to the invention can also be performed with a simpler device than that depicted in FIG. 1. Four hammer rollers 1, which all lie in a plane E, are involved in the process shown. Operation is similar to that described above; however, here the part of material M that has passed through region above all participating hammer rollers 1 is removed as coarse material M". The separating action of the process can be intensified by a larger number of hammer rollers (i.e., more than the four shown) and/or by a steeper angle $\alpha$ (e.g., approximately 40°). Further, additional steps can also be taken to remove fiber material still adhering to coarse material M". When space permits, fine material M' can fall directly (or with the aid of a chute) into a pulp dissolver 10, as shown in FIG. 2.

Figure 3:
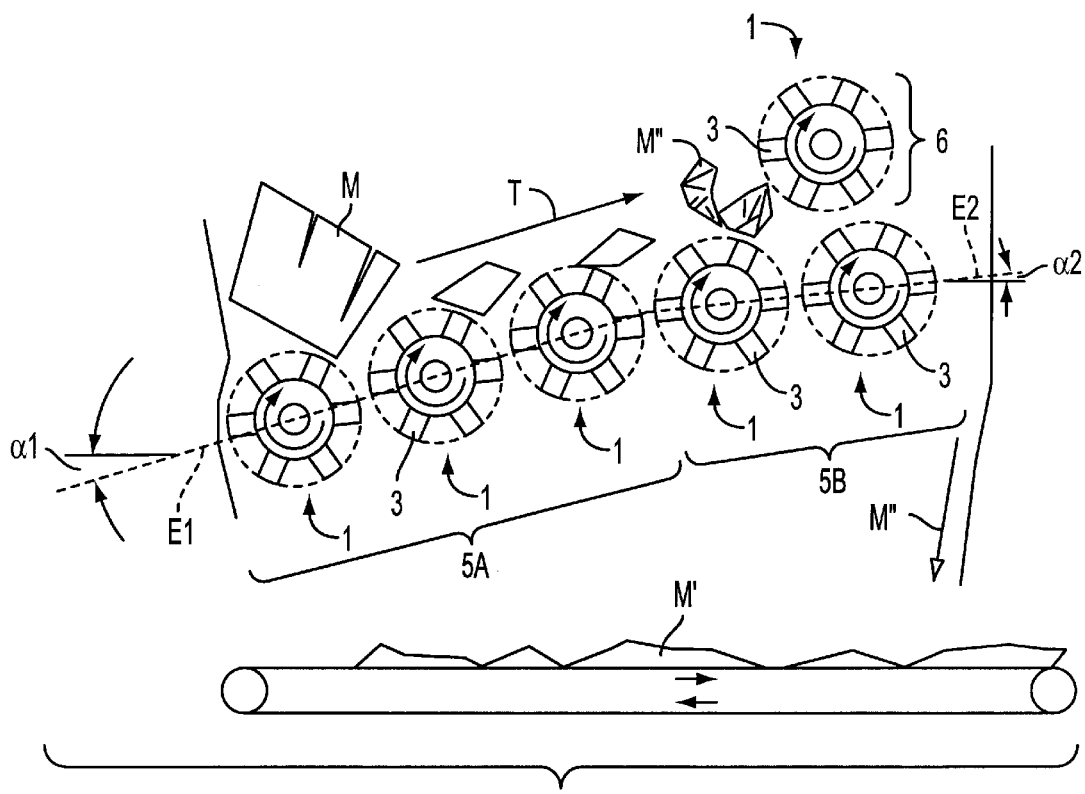

In an alternative embodiment shown in FIG. 3, the material is processed in two sections, in a manner similar to FIG. 1, where the first section is divided into two groups 5A and 5B. Group 5A can include, e.g., three hammer rolls 1 lying one after the other in a plane E1 oriented or tilted by an angle $\alpha 1$ with respect to the horizontal, and second group 5B can include hammer rollers 1 in plane E2 oriented at an angle $\alpha 2$, which is less than $\alpha 1$. In this arrangement, hammer rollers 1 of groups 5A and 5B can be driven at different speeds, preferably slower in second group 5B than in first group 5A. With the arrangement depicted in FIG. 3, it can be easier to recirculate pieces of material M that were not sufficiently broken up in the first pass. In accordance with the this arrangement the top hammer roller 1 of second section 6 transmits an impulse to arriving coarse material M" opposite transport direction T so that previously rejected pieces return to the earlier region.

Figure 4:
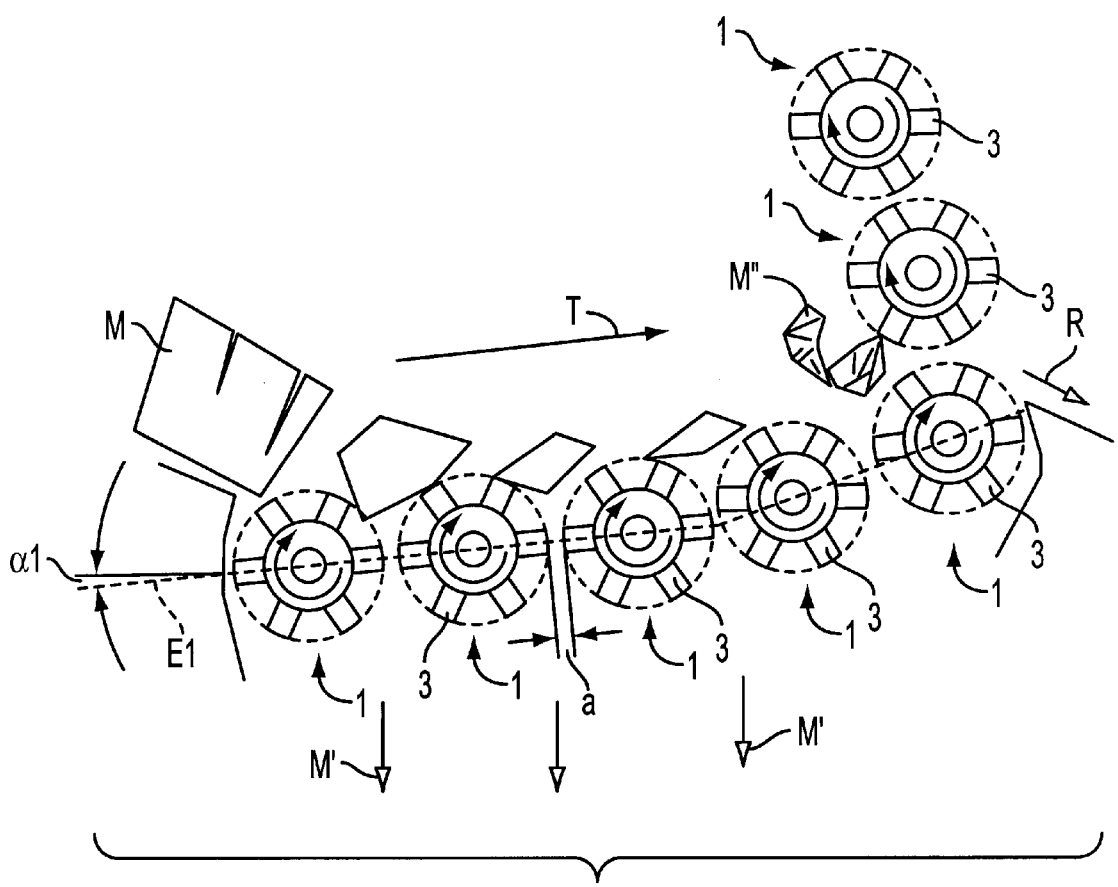

According to FIG. 4, the first section can be divided into two groups whose planes lie at different angles to the horizontal (only plane E1 and angle $\alpha 1$ are shown). This embodiment differs from that depicted in FIG. 3 in that a relatively shallow angle $\alpha 1$ is provided in the initial region of the first section, while a steeper angle is provided in the second group of the first section. As already described, it is possible in many cases to react to the specific prerequisites and conditions of the process by the use of different angles. Specifically, it has been observed that the tendency of supplied material M to be transported in transport direction T varies widely. There are bales or bale fragments that pass through the initial region, which is to say the beginning of the first section, relatively quickly, and are fully separated in that process, while others are not so easily separated. Different angles, different speeds and different numbers of rollers can be chosen in order to optimally utilize the apparatus and to achieve the best possible effect of the process.

Figure 5:
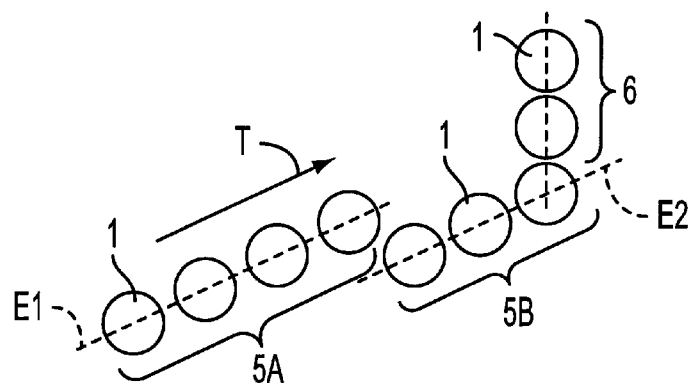

As shown in FIG. 5, the first section can be divided into two groups 5A and 5B in which planes E1 and E2 of the two groups are offset vertically relative to one another. In this way, space can be saved vertically. The return transport from second section 6 would then be adapted to mostly go only as far as the transition between the two groups, which can be entirely desirable.

Figure 6:
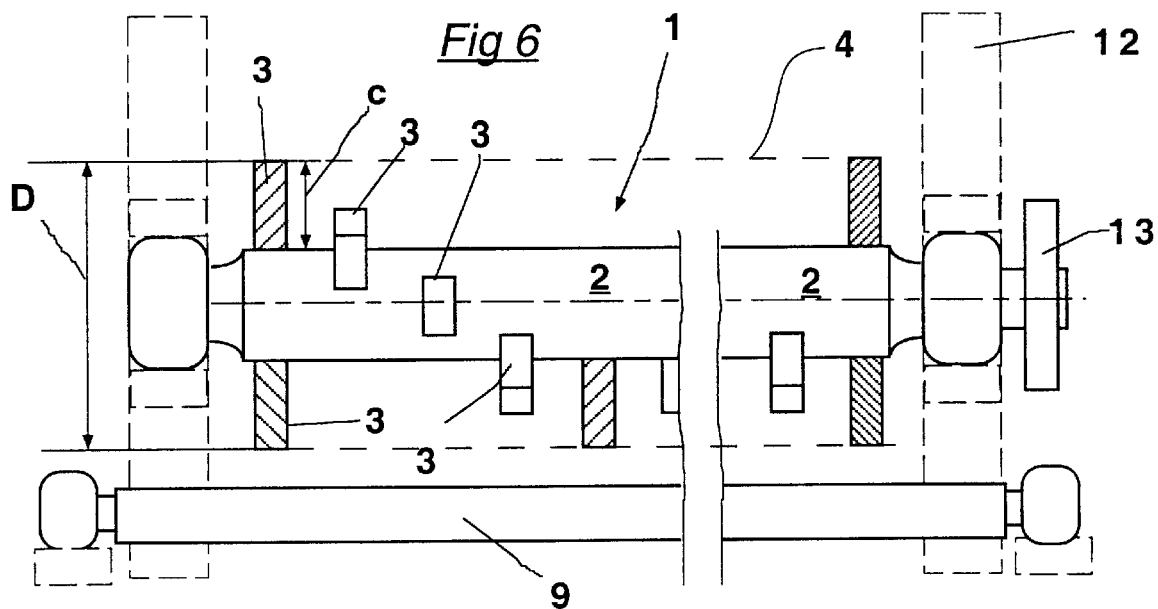
FIG. 6 illustrates a schematic view of a hammer roller.

FIG. 6 illustrates hammer roller 1 with hammers 3 rigidly mounted thereon. Together with hammers 3, hammer roller 1 has an outside diameter D, which can be, e.g, between approximately 200 mm and 500 mm, with a maximum of approximately 1000 mm. Hammers 3 by themselves can advantageously have a radial length c of, e.g., between approximately 50 to 400 mm, and be preferably made of steel. As shown, adjacent hammers 3 on hammer roller 1 can be offset in the circumferential direction relative to one another. Attachment points of hammers 3 to shaft 2 can have a helical progression. The purpose of this arrangement is that, during operation, material M to be broken up is always struck in places that differ axially and can thus perform small lateral and rotational motions, which can result in lateral force components beneficial to the separation and breakup of the material.

The view direction of FIG. 6 corresponds to transport direction T. Below hammer rollers 1, of which only one is shown here, conveyor belt 9 is located to remove fine material M' that has fallen between hammer rollers 1. Conveyor belt rollers and hammer rollers 1 can be mounted on suitable machine frames 12, 12' that are only schematically depicted. Hammer rollers 1 can be placed in rotation by drive wheels 13, which can be, e.g., chain sprockets or gears. A revolving chain drive has the advantage that the spacing of the rollers can be changed in a simple manner and that all hammer rollers 1 that are involved can be driven in the same direction without idlers. However, it can also be especially advantageous to drive the hammer rollers individually so that the rotational speeds can be selected individually, e.g., to alter or control the action of individual regions of the device performing the process. A controller that governs the effectiveness of the process can also be used for this purpose.

Figure 7E:
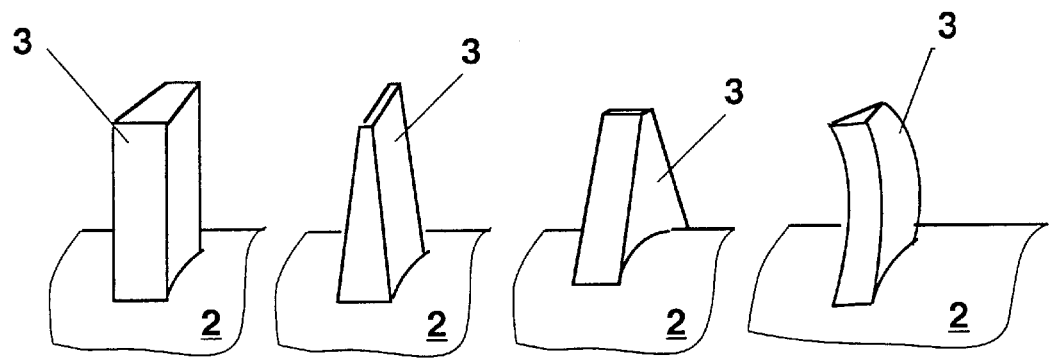
Figure 7E:
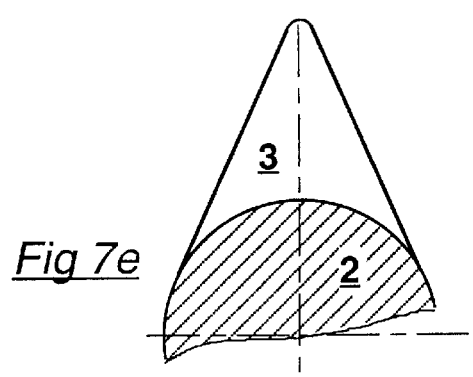
Figure 7F:
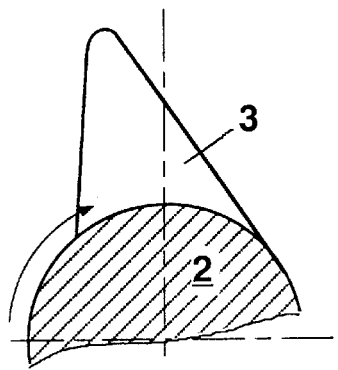

FIGS. 7A–7D show perspective views of some possible hammer configurations. FIG. 7A illustrates hammer 3 having a uniform rectangular profile, FIG. 7B shows a roof-like shape having a top edge pointing in the circumferential direction, and FIG. 7C shows a roof-like shape having a top edge oriented axially. Hammer 3 in accordance with FIG. 7D can be sickle shaped. FIGS. 7E and 7F illustrate schematic side views of two additional embodiments, where 7E has a symmetrical cam and 7F has an asymmetrical cam. In each case, the forward edge in the rotational direction is angled so that wires, which were not removed prior to processing, can be pushed away.

Figure 8:
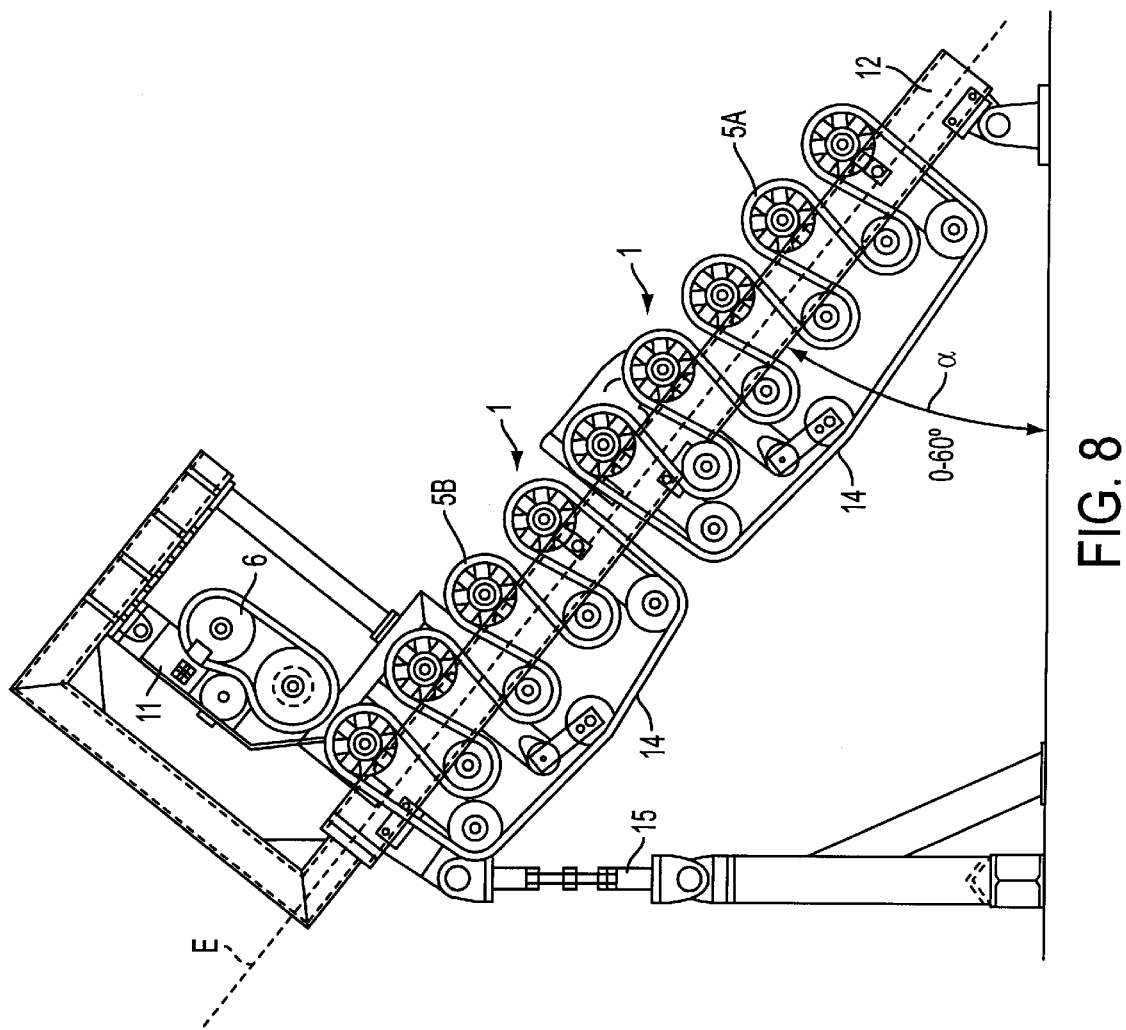
FIG. 8 illustrates a side view of an apparatus according to the invention.
Figure 9:
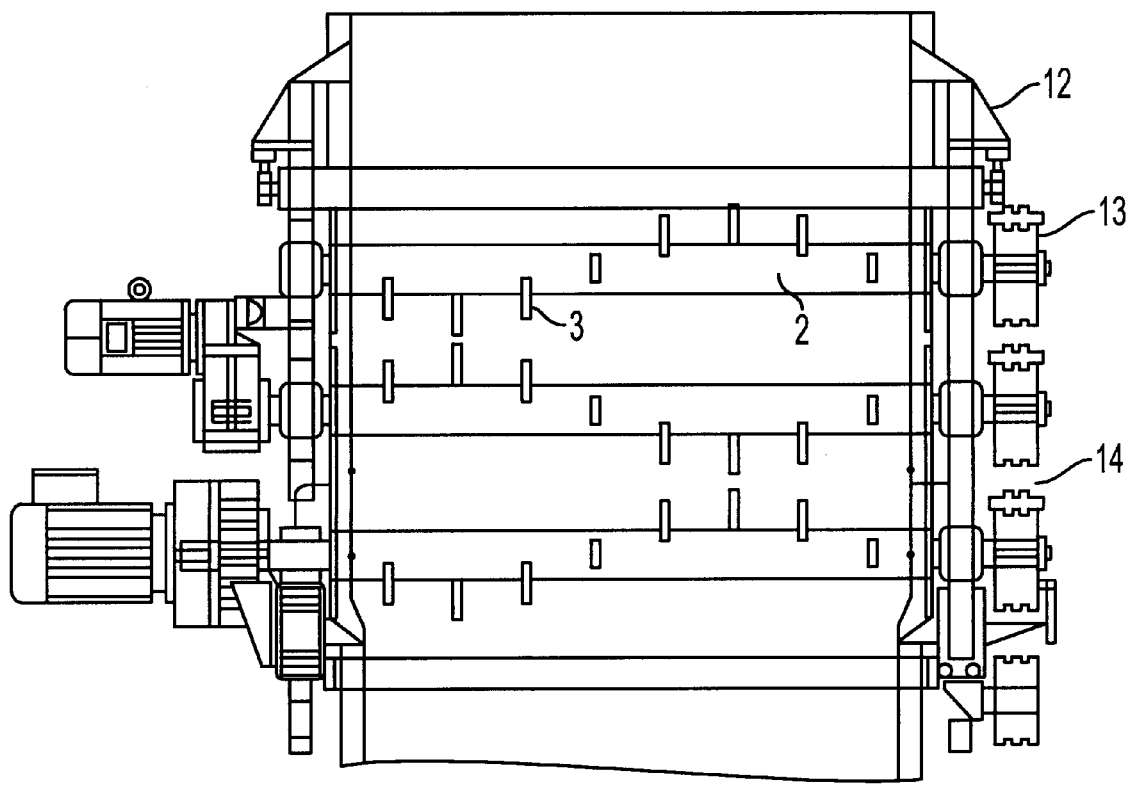
FIG. 9 illustrates a front view of the apparatus depicted in FIG. 8.

FIGS. 8 and 9 show an apparatus for performing the process according to the invention. Further, while this illustration is simplified, it is more detailed than the other Figures and is substantially to scale. Machine frame 12 is shown having a tilt-adjustable part, e.g., between approximately 0° and 60°, and a total of nine hammer rollers 1 with hammers 3. A first section can be divided into two groups, first group 5A with five hammer rollers 1 and second group 5B with four hammer rollers 1. In accordance with this arrangement, both groups have the same angle, e.g., a maximum of approximately 60°, but are provided with separate drives. In this manner, the groups can be driven at different rotational speeds. Thus, circumferential speeds can be set. At the end of second group 5B, a second section 6 is located, which is equipped with two hammer rollers 1 and corresponding hammers 3. Second section 6 can also be provided with a separate drive. In the exemplary arrangement shown, adjusting device 15 for the angle can only be changed using various tools. Further, it is also possible to adjust the angle either electrically or hydraulically.

FIG. 9 illustrates a front view of the apparatus depicted in FIG. 8.

Figures 10, 11:
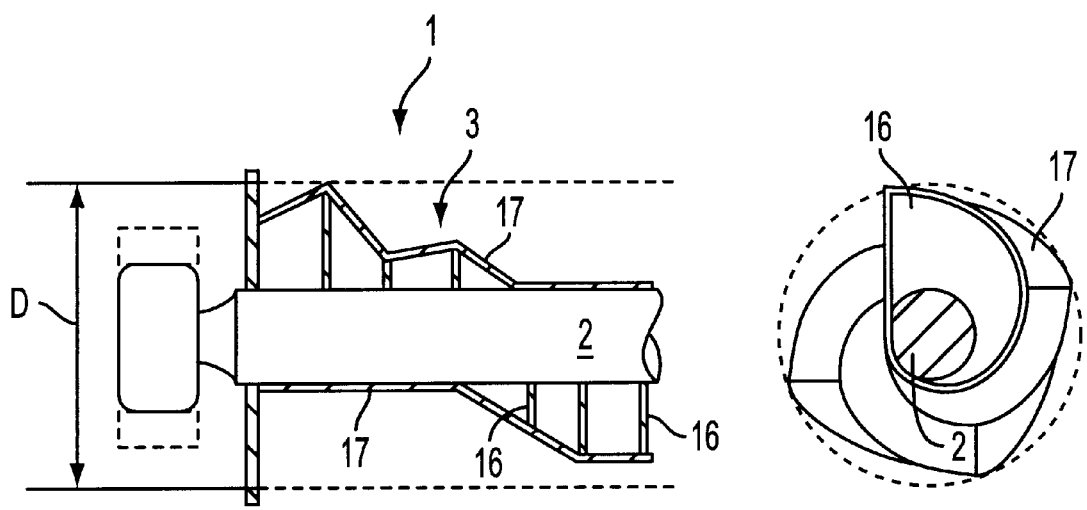
FIG. 10 illustrates an alternative hammer roller.
FIG. 11 illustrates a sectional view of the hammer roller depicted in FIG. 10.

While hammers 3 in the previously described figures are drawn as separately attached parts, they can also be directly connected to one another in an axial manner. FIG. 10 illustrates an example of this arrangement. Here, shaft 2 can be surrounded by a number of asymmetrical support plates 16 that are offset with respect to one another. These plates carry a surface element 17, formed, e.g., as an enclosing jacket, that acts as a processing surface for material M. This embodiment of hammer roller 1 can be more resistant to spinning pieces, e.g., bands and wires, as they cannot easily become caught on hammers 3. Moreover, it suffers less wear. Moreover, a hammer roller with such a continuous processing surface can be manufactured in different ways, e.g., by forging or the use of individual elements that are connected axially.

FIG. 11 illustrates a cross-section through hammer roller 1 depicted in FIG. 10. Like FIG. 10, only the basic structure of the roller is shown.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A process for separating compressed material containing paper fibers in an apparatus that includes at least three hammer rollers arranged essentially in a same plane and each hammer roller includes rotatable hammers, the process comprising:

rotating the rotatable hammers;

transporting the material over the at least three hammer rollers in a transport direction essentially parallel to the plane and transverse to the axes of the rollers;

breaking up the material into fine material and non-fine material; and separating the fine material from the non-fine material by allowing the fine material to pass through gaps formed between the hammer rollers.

2. The process according to claim 1, wherein the non-fine material includes coarse material, and the process further comprises carrying away the coarse material.

3. The process according to claim 1, wherein, at the start of the breaking up and separating, the material includes one of bales or large pieces of bales at least some of which have a weight of at least approximately 100 kg.

4. The process according to claim 3, wherein the material does not include binding wires or bands.

5. The process according to claim 1, further comprising orienting the plane at an angle between approximately 0° and 90° relative to the horizontal.

6. The process according to claim 5, wherein the plane is oriented at an angle between approximately 20° and 50°.

7. The process according to claim 5, wherein the plane is oriented at an angle sufficient to substantially evenly distribute the material over the at least three hammer rollers in the transport direction.

8. The process according to claim 1, the apparatus further comprising a material supply device, and the process further comprises supplying the material on the material supply device in a direction substantially perpendicular to the transport direction.

9. The process according to claim 1, wherein the non-fine material includes coarse material, and the process further comprises further processing the coarse material together with the fine material.

10. The process according to claim 1, further comprising:

conveying the fine material to a pulp dissolver; and converting the fine material into a suspension.

11. The process according to claim 1, further comprising transmitting forces to the material with the hammers, wherein the forces are lateral forces having a component lying in the direction of the axes of the hammer rollers.

12. The process according to claim 1, wherein the apparatus further includes gaps formed between envelope curves of the rotatable hammers of the hammer rollers, and the process further comprises sizing the gaps so that the fine material can fall down through them.

13. The process according to claim 1, wherein the apparatus further includes gaps formed between shafts of the hammer rollers having a distance of between approximately 200 and 1000 mm.

14. The process according to claim 1, wherein the apparatus further includes a portion of the at least three hammers forming a first section and another portion of the at least three hammers forming a second section, such that the second section is arranged above and downstream from, relative to the transport direction, the first section, and at least one additional hammer roller with rotatable hammers, and the process further comprises returning non-fine material to the first section via the at least one additional hammer roller.

15. The process according to claim 14, wherein the separation occurs in both the first and second section.

16. The process according to claim 14, further comprising moving at least one hammer roller of the second section to increase a distance from a neighboring hammer roller.

17. The process according to claim 14, wherein the second section includes two hammer rollers arranged one atop the other.

18. The process according to claim 1, further comprising driving the hammers with a circumferential speed of between approximately 1 and 3 m/sec.

19. The process according to claim 1, further comprising rotatably driving neighboring hammer rollers at different speeds.

20. The process according to claim 1, wherein the apparatus further includes arranging the at least three hammer rollers into a first and a second section, in which the second section is located downstream, relative to the transport direction, of the first section, and dividing the first section into a first and second group, in which the second group is located downstream, relative to the transport direction, of the first group, and the process further comprises:

rotating the hammer rollers in a same section in a same direction and at a same circumferential speed; and rotating the hammer rollers in another section at a different circumferential speed.

21. The process according to claim 20, further comprising:

rotating the hammer rollers in the first group in a same direction and at a same circumferential speed; and rotating the hammer rollers in the second group at a different circumferential speed.

22. The process according to claim 21, wherein the circumferential speed of the hammer rollers of the first group is slower than circumferential speed of the hammer rollers of the second group.

23. The process according to claim 20, wherein the circumferential speed of the hammer rollers of the first section is slower than circumferential speed of the hammer rollers of the second section.

24. The process according to claim 20, wherein the hammer rollers of a same group are arranged in a same plane.

25. The process according to claim 24, wherein planes for the different groups are oriented at different angles.

26. The process according to claim 20, wherein the hammer rollers of a same section are arranged in a same plane.

27. The process according to claim 26, wherein planes for the different sections are oriented at different angles.

28. The process according to claim 1, wherein a total specific work to convert the material into fine material through the breaking up and separation is a maximum of approximately 10 kWh per ton of fine material based on absolute dry weight.

29. The process according to claim 1, wherein the material is comprised of at least one of paper or paperboard webs and has a water content that does not exceed approximately 70%.

30. The process according to claim 1, wherein a water content of the material is between approximately 3% and 30%.

31. The process according to claim 1, further comprising reversing a rotational direction of at least one portion of the at least three hammer rollers at certain time intervals, whereby bands, films, and other elongated items that become wound around the shaft are unwound and removed.

* * * * *